US006941739B1

(12) United States Patent
Gliser

(10) Patent No.: US 6,941,739 B1
(45) Date of Patent: Sep. 13, 2005

(54) QUICK ATTACH MECHANISM FOR WALK-BEHIND MOWERS

(76) Inventor: Kevin Gliser, 306 W. Thomas St., Roxana, IL (US) 62084

( * ) Notice: Subject to any disclaimer, the term of this patent is extended or adjusted under 35 U.S.C. 154(b) by 0 days.

(21) Appl. No.: 11/007,934

(22) Filed: Dec. 10, 2004

(51) Int. Cl.[7] .............................................. A01D 34/03
(52) U.S. Cl. ........................... 56/16.7; 172/272; 37/244
(58) Field of Search ................ 56/16.7, 1, 2; 172/681, 172/753, 123, 810, 272, 275; 37/242, 244

(56) References Cited

U.S. PATENT DOCUMENTS

| 4,243,356 A | * | 1/1981 | Takojima | .................... 414/723 |
| 5,666,794 A | * | 9/1997 | Vought et al. | ............... 56/15.2 |
| 5,713,420 A | * | 2/1998 | Roberts et al. | ............... 172/42 |
| 5,992,134 A | | 11/1999 | Blide et al. | |
| 6,643,959 B2 | * | 11/2003 | Jolliff et al. | .................. 37/244 |

2004/0007402 A1  1/2004  Kujawa

* cited by examiner

Primary Examiner—Árpád Fábián Kovács
(74) Attorney, Agent, or Firm—Don W. Weber

(57) ABSTRACT

A quick attaching mechanism is provided for a walk-behind mower power unit. The walk-behind mower power unit deck has upper brackets attached to the front of the deck and lower holes drilled into the lower part of the vertical sides of the deck. The accessory unit deck has an upper horizontal rod attached to the left and right sides of the accessory unit and lower attaching holes corresponding to the lower holes in the left and right lower sides of the power unit. The lower sides of the accessory unit also have a V-shaped adapting bracket to facilitate the alignment of the lower holes. Once the rod is pivotably secured in the upper brackets and the lower holes are aligned, a handle pin is inserted through the lower holes and secured. Utilizing this method and mechanism many different types of accessories are readily and quickly attached to a walk-behind power unit.

2 Claims, 3 Drawing Sheets

QUICK ATTACH MECHANISM FOR WALK-BEHIND MOWERS

BACKGROUND OF THE INVENTION

This invention relates to the field of outdoor, powered landscaping devices such as walk behind-mowers. In particular, the Inventor herein describes a quick attach mechanism for various powered accessories for a walk-behind mower.

In the landscaping field, power mowers are in common use. One type of power mower consists of an all-inclusive unit, such as the standard powered lawn mower or garden tractor. Another type of powered mower currently in common use, particularly in the professional landscaping trade, is a walk-behind mower. A walk-behind mower has two distinct parts. A first power unit includes the engine, a power source (commonly a gasoline engine), a deck, power drive shaft and handles and wheels. Commonly attached to the power unit are accessory units that can include a mowing unit, a snow blower, or various other types of accessories.

Inventions previously described in other patent applications or patents include the use of a walk-behind power unit with various accessories. Accessory attachment to a walk-behind power unit is described in U.S. Patent Application 2004007402 filed by Roger Kujawa in January of 2004. Kujawa describes a powering device with an engine, frame and handle (the power unit) as well as a power shaft and coupling for transferring power from the power unit to various working attachments (the accessories). While Kujawa's disclosure is of general interest in the field, Kujawa does not disclose or teach a method and mechanism to quickly attach various accessories to the power unit. Kujawa couples his two units together (the power unit and the accessory unit) by attaching clamping plates to the two separate units. While Kujawa does describe accessories clamped to a walk-behind power unit, the Kujawa method for attaching the two devices together is cumbersome and time consuming. It is an object of this invention to provide a quick method and mechanism for attaching accessories such as mower units or snow blowers to a walk-behind mower.

Accessories other than mowers and snow blowers may be attached to a power unit by various means. For example, in the 1999 Patent issued to Blide, U.S. Pat. No. 5,992,134, discloses a walk-behind mower with a broadcast spreader attachment. Blide describes a number of spreaders that include a hopper or other dispensing devices. However, Blide attaches the spreader accessory to the power unit by mounting points which are fixed by conventional means such as screws, clamps, bolts, snaps, quick releases, or pinching members. The Blide method and mechanism for attaching the accessory to the power unit requires that bolts be attached for the two units. This is cumbersome, time consuming, and could delay the use of the accessories. It is another object of this invention to provide for the quick release and attachment of various accessories such as a mower unit, snow blower, aerator, leaf vacuum, edger, or other type of accessory to a walk-behind power unit.

Utilizing the method described below, many different types of accessories may be universally attached to a power unit. The ability of one power unit to function in many different ways, as a result of a method and mechanism to quickly detach and attach different types of accessories, is a decided improvement over the prior art. It is a still further object of this invention to provide a quick attach means for use with a walk-behind mower that allows the mower to be quickly and conveniently converted into many different devices to be used in many different functions.

Other and further objects will become obvious upon reading the below described specification.

BRIEF DESCRIPTION OF THE DEVICE

A walk-behind power unit includes a motor, guiding handles, and a lower power unit deck that has a power shaft for driving accessories. Attached to the upper part of the front of the deck are left and right brackets. The upper brackets have a slot for receiving a rod. The lower left and right sides of the power unit deck have a hole for securing the accessory to the power unit. The accessory to be attached to the walk-behind power unit could include a mower, snow blower, or any other type of powered accessory device. The accessory device has an upper horizontal rod attached to the front of the accessory device. The lower front sides of the accessory device each have a securing hole corresponding to the lower securing hole of the power unit sides. In order to attach the accessory to the power unit, one simply places the rod in the upper rod slots and pivots the unit such that the lower corresponding holes are in alignment. A handle pin is then put through the lower holes and the accessory unit is secured to the power unit. Connecting the power unit drive shaft to the drive shaft of the accessory completes the attaching process and the entire two-piece unit is ready to function. Utilizing this method and mechanism, many different accessories may be quickly and easily attached to the power unit of a walk-behind mower.

DETAILED DESCRIPTION OF THE PREFERRED EMBODIMENT

Figure 1:
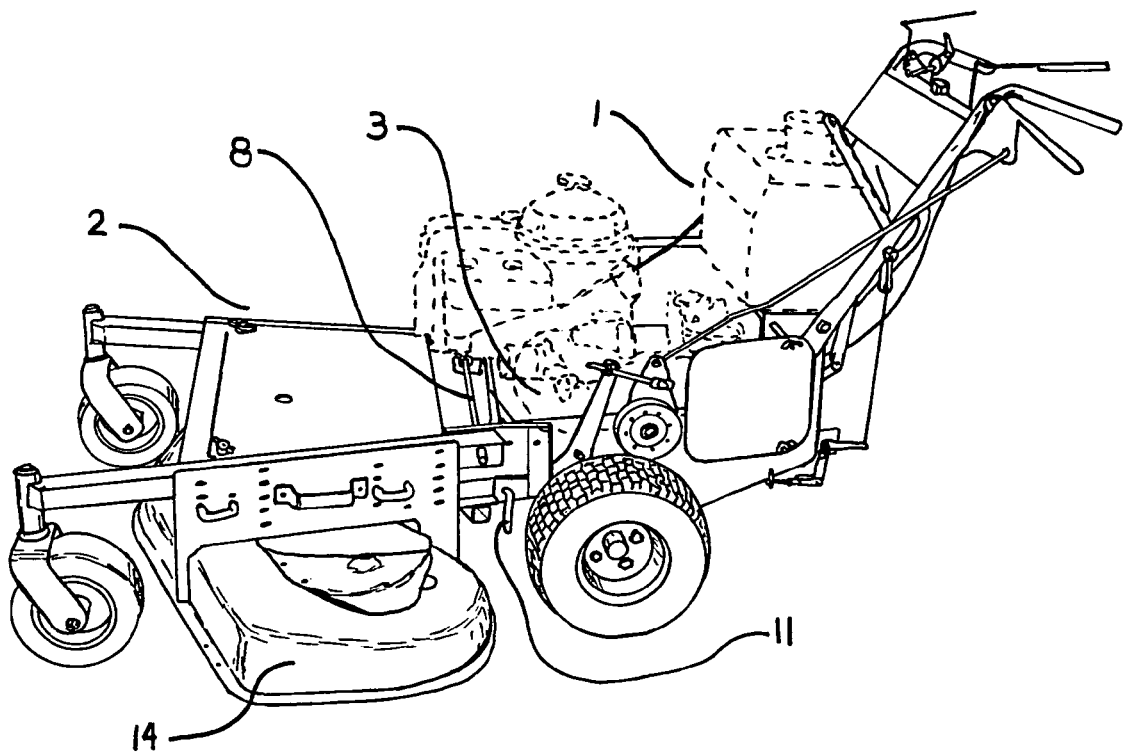
FIG. 1 is a perspective view of the power unit with a mower unit accessory attached according to the disclosure of this device.

A powered walk-behind mower unit 1, as shown in FIG. 1, may be readily and quickly attached to an accessory unit 2. The accessory unit may be a mower unit as shown. The walk-behind mower unit 1 has a motor, handles, and a lower power unit deck 3. The lower power unit deck 3 has left 4 and right 4' vertical sides, as best shown in FIG. 3.

Figure 2:
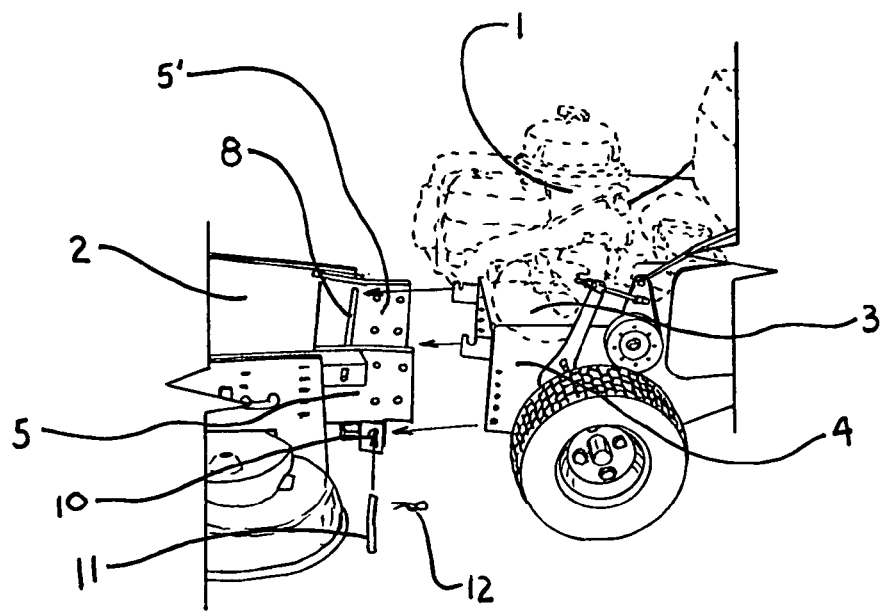
FIG. 2 is a perspective view of the power unit and accessory device in the unattached position.
Figure 3:
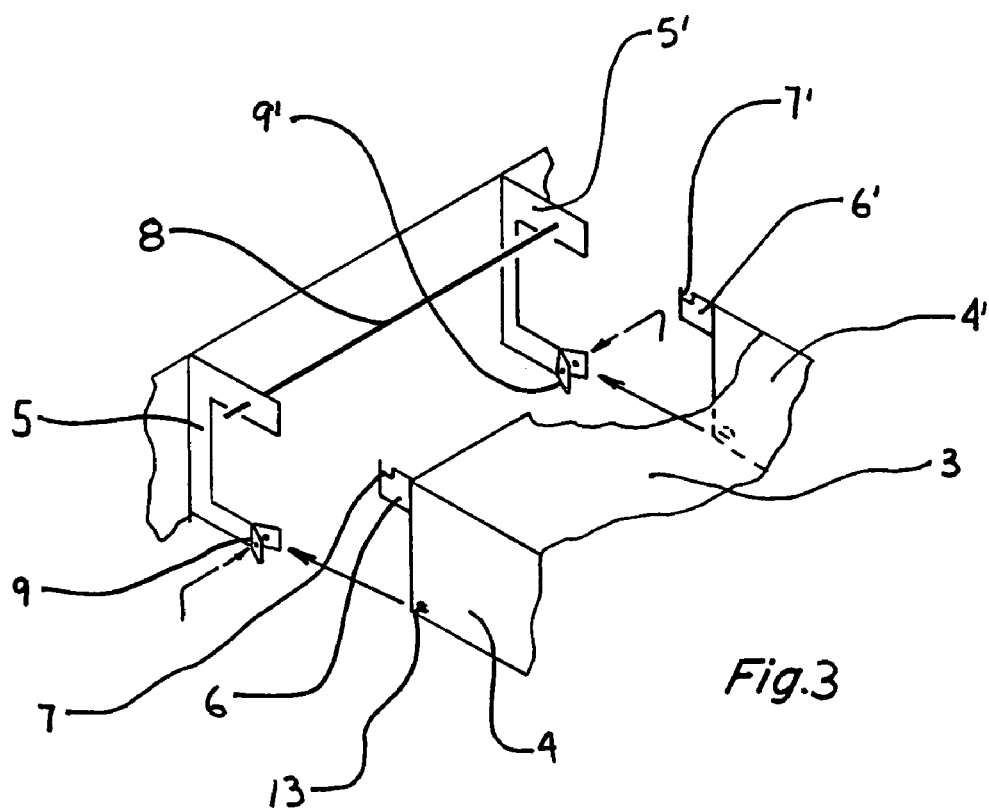
FIG. 3 is an exploded perspective detail view showing the attaching mechanism.
Figure 4:
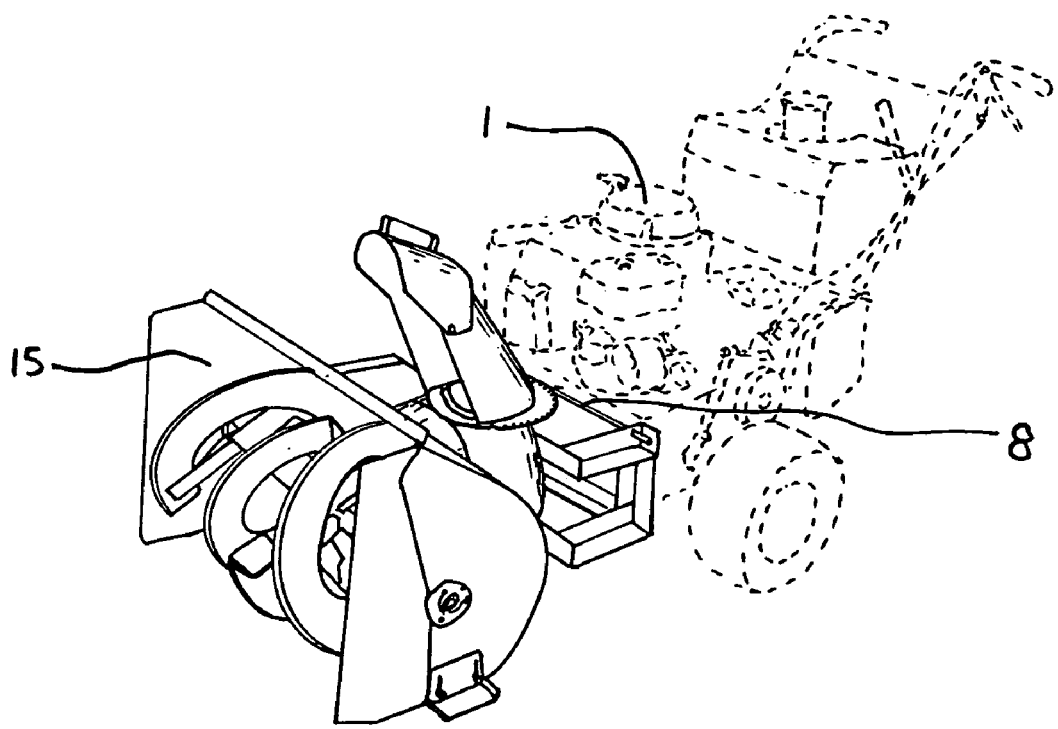
FIG. 4 is a perspective view of a snow blower attachment showing the power unit in phantom.

The accessory unit 2 also has a lower deck with left 5 and right 5' vertical sides corresponding to the left and right sides of the power unit, as best shown in FIGS. 2 and 3. The accessory unit may be a mower, snow blower, or other accessory device. It is within the contemplation of this device that various accessories may be quickly and readily attached to a walk-behind power unit. These accessory devices could include but are not limited to a mower, aerator, a power broom, snow blower, snow blade, cart, dump barrow, stump grinder, leaf vacuum, leaf blower, chipper, shredder, edger, bed edger, bed trencher, trencher, log splitter, air compressor, generator, spreader, sprayer, pressure washer, tiller, pallet dolly, detacher, over seeder, verticutter, brush hog, ditching machine, striping machine, truck loader, trailer dolly, parking lot stripping machine, top dresser, pump, welder or augur. All of these accessory devices can be quickly and easily attached to the walk-behind power unit utilizing the method and mechanism described herein. The quick and easy attachment of these accessory devices to a walk-behind mower make the mower much more valuable and versatile and thus enhances the usefulness and utility of a walk-behind mower power unit.

Figure 5:
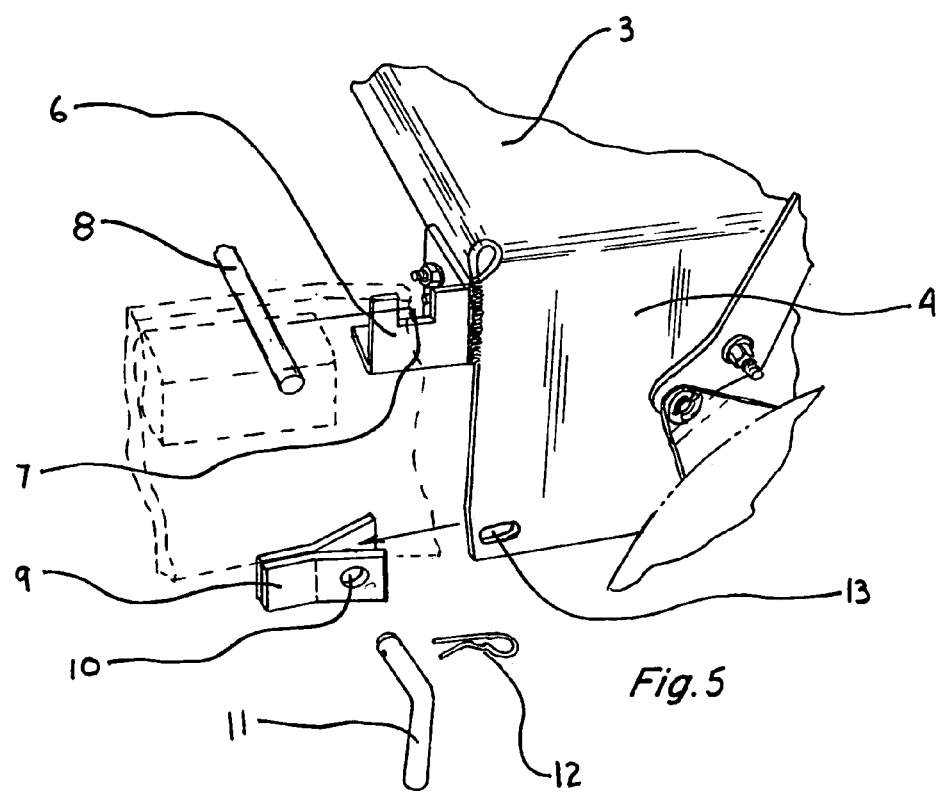
FIG. 5 is a detail perspective view showing the deck of the power unit attachment mechanism of this device.

Turning now to FIGS. 3 and 5, the attaching mechanism for the power and accessory units are shown. The power unit 1 has a pair of upper left 6 and right 6' attaching brackets attached to the upper part of the left and right sides of the power unit respectively. Each upper bracket has left 7 and right 7' rod slots cut into them. The rod slots 7 and 7' are adapted to receive the accessory unit upper rod 8. The left 4 and right 4' vertical sides of the power unit deck 1 also have lower attaching holes 13. These lower securing holes 13, as best shown in FIG. 5, are somewhat elongated so as to allow for tolerance in the alignment of the holes from the accessory device.

Figure 6:
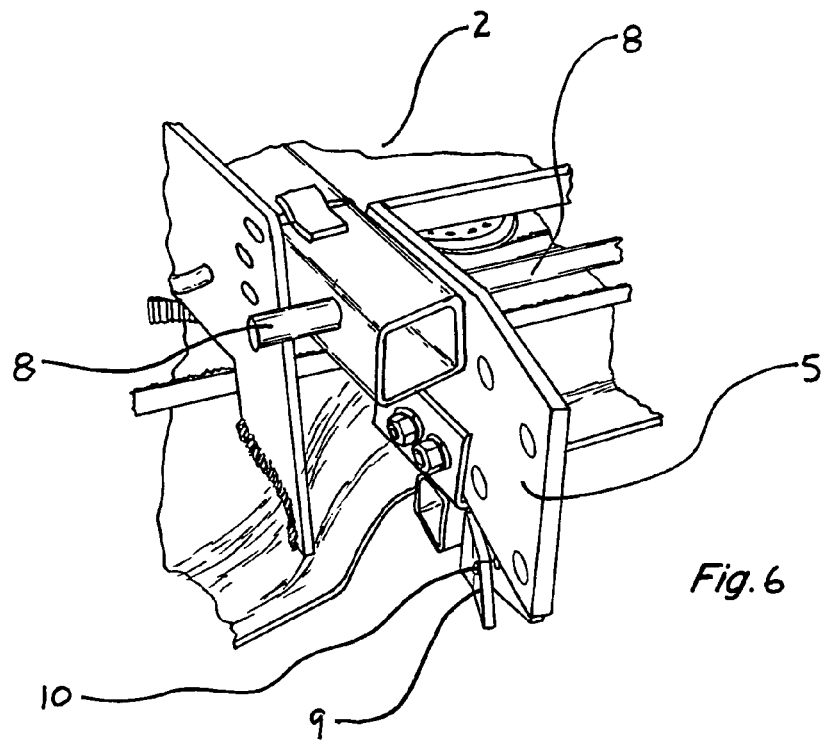
FIG. 6 is detail perspective view showing the deck of the accessory unit attaching mechanism of this device.

Turning now to the attaching mechanism for the accessory 2, as best shown in FIGS. 3 and 6, the accessory device is quickly and readily attachable and detachable to the power unit by the upper horizontal rod 8 and lower corresponding accessory deck holes. As shown in FIG. 3 schematically, the accessory unit 2 has left 5 and right 5' vertical sides. (While the exact structure of these accessory unit vertical sides may vary, they are generally vertical and narrow, as shown.) Attached to the front upper part of the left and right sides of the accessory unit deck is an upper horizontal rod 8. The upper part of the accessory unit may be pivotably attached to the upper part of the power unit deck 3 utilizing this upper pivoting rod 8. Each side of the accessory unit has lower attaching holes corresponding to the lower attaching holes of the power unit.

In the preferred embodiment, each left 5 and right 5' lower side of the accessory unit also has an accessory unit lower attaching v-shaped bracket 9, as best shown in FIG. 6. This lower attaching bracket 9 may simply be a vertical plate or, preferably, is a V-shaped bracket as shown in drawing FIGS. 5 and 6. The V-shaped bracket 9 is useful in attaching the vertical sides of the accessory unit to the vertical sides of the power unit. Since the lower bracket 9 is V-shaped as shown, the vertical side 4 of the power unit readily receives the side of the accessory unit. The lower attaching bracket 9 of the accessory unit also contains a lower attaching bracket securing hole 10 as shown in the drawing figures.

When the upper horizontal rod 8 of the accessory unit is placed into the rod slot 7–7' of the power unit, the accessory unit can pivot such that the accessory unit securing holes 10 may be aligned with the power unit lower corresponding securing holes 13. A securing handle pin 11 is then inserted through the accessory unit holes 10 and the power unit corresponding holes 13 and is secured in place by the handle snap pin 12.

For most accessory units, the vertical sides 5 and 5' are extended out from the accessory unit deck such that the rod and lower holes may be adapted to original manufacture units without any modifications, as shown particularly in FIG. 6. However, it is within the spirit and contemplation of this invention that certain accessory units may require the addition of accessory unit vertical side extensions or other slight modifications. These vertical side extensions for the accessory unit 2 would also include extension upper rod brackets and a rod and accessory extension lower securing holes. The lower extension securing holes would line up with the power unit lower corresponding securing holes 13. Once the lower holes are lined up the standard handle pin 11 and handle pin clamp 12 are utilized to secure the accessory unit to the power unit.

As described above, this device is universally adaptable for nearly all of the power units and accessory devices sold. Particularly illustrated in this disclose is a mower accessory unit 14 and a snow blower accessory unit 15. It is within the spirit and contemplation of this invention that all types of accessory units are attachable to the walk-behind power unit 1.

It is also within the spirit and disclosure of this device that the attaching means for the power unit output shaft and the accessory unit drive shaft may include a mechanism for reducing the gear ratio between the power unit shaft and the accessory unit drive shaft. It is further within the contemplation and disclosure of this device that a right angle gear box may be included in this mechanism to accommodate accessory units that have a drive shaft that is perpendicular to the output drive shaft of the power unit.

Minor variations in the mechanism and method disclosed herein are within the spirit and keeping of this invention. However, the invention herein allows a user to quickly and readily adapt his power unit to the different types of accessories in use.

In order to practice this invention one simply places the accessory unit upper rod 8 into the power unit upper bracket slots 7-7'. The accessory unit pivots on the upper rod. The lower part of the accessory vertical sides slide into the vertical sides of the power unit until the accessory securing holes 10 are aligned with the power unit lower corresponding holes 13. The handle pin is then inserted through the right and left lower corresponding holes. The lower securing handle 11 then firmly secures the accessory and power decks together. Accessories may be quickly attached, detached and easily interchanged and secured using the method and mechanism described.

Having fully described my device, I claim:

1. In a powered device that includes a walk-behind power unit with a lower deck having left and right vertical sides and an attachable accessory unit that has a deck having corresponding left and right vertical sides, the improvement comprising:
   (a) a pair of left and right brackets, attached to the upper part of the left and right sides of the power unit, respectively, each bracket having a slot for receiving a rod;
   (b) wherein each vertical side of said power unit has lower attaching holes;
   (c) a horizontal rod attached to the front upper part of the accessory unit deck;
   (d) wherein each side of said accessory unit has lower attaching holes corresponding to the lower attaching holes of the power unit;
   (e) an attaching handle pin with an attachable snap pin; wherein an accessory unit may be quickly attached and detached from a power unit by securing said rod in said rod brackets, aligning said lower holes and securing the lower part of the accessory and power units by inserting said handle pin through the corresponding lower holes.

2. The device in claim 1, further comprising a v-shaped bracket, attached to each lower vertical side of said accessory unit.

* * * * *